Nov. 28, 1967  W. L. POLAND  3,355,692
FUNCTION GENERATORS

Filed April 27, 1955  2 Sheets-Sheet 1

INVENTOR.
WILLIAM L. POLAND.
BY *William R. Sherman*
HIS ATTORNEY.

Nov. 28, 1967  W. L. POLAND  3,355,692
FUNCTION GENERATORS
Filed April 27, 1955  2 Sheets-Sheet 2

INVENTOR.
WILLIAM L. POLAND.
BY *William P. Sherman*
HIS ATTORNEY.

United States Patent Office 3,355,692
Patented Nov. 28, 1967

3,355,692
FUNCTION GENERATORS
William L. Poland, Bethel, Conn., assignor, by mesne assignments, to Schlumberger Well Surveying Corporation, Houston, Tex., a corporation of Texas
Filed Apr. 27, 1955, Ser. No. 504,260
4 Claims. (Cl. 338—89)

This invention relates to function generators and more particularly, to computing apparatus for generating a signal functionally dependent upon two variable signals.

In proposed systems for representing a specific non-linear or empirical function of two variables, non-linear elements such as tapered function potentiometers, potentiometers with non-linear wiper movements, and non-linearly machined three dimensional cams are commonly incorporated. Dependence upon such a non-linear element, however, restricts the versatility of a function generator. Thus, a change of functions or even a modification of the specific function requires replacement of the non-linear elements. In general elements with a prescribed non-linear characteristic are more expensive, less accurate in tolerances, and more difficult to obtain than a comparable element with linear characteristics. In consequence, analog systems for generating empirical or non-linear functions of two variables have been acceptable only under very restricted conditions.

An object of the present invention is to provide new and improved apparatus for generating a non-linear or empirical function of two variables which do not require such non-linear elements, and thereby avoid the above-noted disadvantages and limitations.

Another object is to provide a two variable function generator wherein the function represented may be altered by simple hand manipulation without requiring a replacement of its parts or an alteration in its operating characteristics.

Yet another object is to provide new and improved function generating apparatus of a rugged, economical construction affording a high degree of reliability.

Yet another object of this invention is to provide a function generator wherein only a limited number of values need be entered to afford an accurate approximation of a continuously varying function value.

These and other objects of the invention are realized by connecting to tap points which form a coordinate grid on a conductive surface, a limited number of discrete potentials. By selective connection of these tap points, a variation in potential is established to represent any prescribed single-valued function of two variables which may be measured in terms of the coordinate grid. For each set of values for the variables, there is a point in relation to the grid at which a probe may be positioned to detect a potential substantially representing the corresponding value of the prescribed function. Selective connection to the tap points is effected behind the conductive surface so that the surface may have continuous contact with such a probe. The tap points themselves are disposed slightly beneath the surface, yet are in such electrical proximity to the surface that the potential at a surface point opposite a tap is substantially that of the tap.

The invention will be better understood, and others of its objects and advantages perceived, from the following detailed description, taken in conjunction with the drawings, in which.

Figure 1:
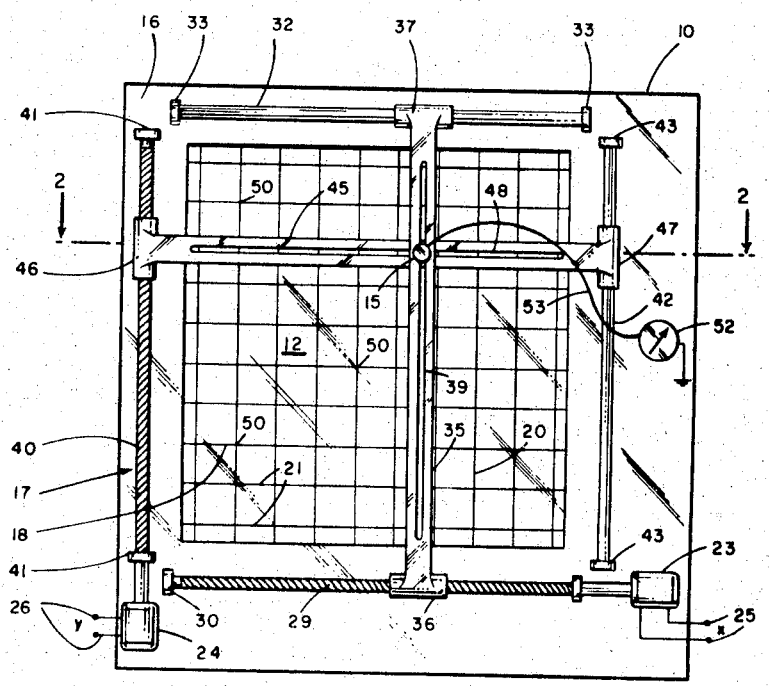
FIG. 1 is a plan view of apparatus constructed in accordance with this invention for generating a function of two variables.

In FIG. 1 there is shown computing apparatus 10 for generating a function $z$ of two variables $x$ and $y$. The $x$ and $y$ input variables are given in the apparatus 10 a positional representation, while the dependent variable $z$ is manifested by the magnitude of a potential. The manifestation of the dependent variable $z$ for all of its values is a static electric field impressed upon a conductive surface 12, the conductivity of this surface 12 causing its potential to vary in a continuous manner. Representation of the $x$ and $y$ input variables is achieved by positioning the tip 14 of a probe 15 at a point on the surface 12 determined by the values of the input variables.

The function generator 10 more particularly comprises a box-like platform or base 16 which supports an $x$–$y$ positioning servomechanism 17 in fixed relation to the surface 12. For reasons to be developed more fully hereafter, the surface 12 may be considered as ruled off in a two coordinate grid 18 which, for most functions, consists of an orthogonal set of parallel columnar lines 20 corresponding to incremental values of $x$ and parallel row lines 21 corresponding to successive increments in the $y$ value. The servomechanism 17 is accordingly arranged to move the probe 15 with reference to the columnar lines 20 in dependence upon one variable and to move the probe with reference to the row lines 21 in correspondence with the other variable.

To this end, the servomechanism 17 comprises an $x$ positioning servomotor 23 and a $y$ positioning servomotor 24. Terminals 25 arranged for application of a signal representing the $x$ variable are connected with the $x$ servomotor 23, while terminals 26 arranged for application of a signal representing the $y$ input variable are connected with the $y$ servomotor 24. The $x$ and $y$ servomotors may be of any suitable type provided with a positional feedback, rate feedback and change speed gearing and having the form, for example, as shown in the text, Electronic Analog Computers, by Korn and Korn at page 235, published by McGraw-Hill Book Company, Inc., in 1952.

The $x$ servomotor 23 is in driving connection with a threaded screw shaft 29 journaled on support posts 30 to have a span parallel with the surface 12 and at least co-extensive therewith. A smooth guide rod 32 is supported by posts 33 for a similar span alongside the opposite edge of the surface 12. Extending in parallel relation over the surface 12 is a traverse bridge 35 having a threaded bearing 36 at one end in driving engagement with the screw shaft 29 and a smooth bearing 37 at the other end for sliding movement along the guide rod 32. Extending longitudinally of the traverse bridge 35 is an elongated slot 39, which by the orientation of the shaft 29 and rod 32 extends parallel to the columnar lines 20 of the surface 12.

In a similar fashion, the $y$ servomotor 24 is in driving connection with a threaded screw shaft 40 supported on journal posts 41 for a span along one edge of the surface 12 in parallel relation to the surface. Along the opposite edge is a smooth guide rod 42 supported for a similar span by posts 43. Extending over the surface 12 in parallel relation but under the bridge 35 is a transverse bridge 45 having a bearing 46 at one end in driving connection with the screw shaft 40 and a smooth bearing 47 at the other end in sliding engagement with the guide rod 42. The traverse bridge 45 is provided with an elongated slot 48 extending over the surface 12 in the direction of the row lines 21.

At the intersection of the slots 39 and 48 a sleeve 49 extends through bridges 35, 45 and is supported thereby with its axis normal to the surface 12. The probe 15 is received within this sleeve 49 slidably so as to have rotary and axial degrees of freedom. Where the surface 12 underlies the probe 15, the force of gravity may be employed to urge the tip 14 of the probe into electrical contact with the surface. Otherwise, a resilient bias is applied between the sleeve 49 and probe 15 to urge the latter into contact with surface 12. A sliding fit between the sleeve 49 and the slots 39, 48 allows the probe 15 to follow the point at which the slots intersect without constraint, that is, without requiring an orthogonal stepwise movement. The extension of the slots is such that the probe may assume any point with reference to the coordinate grid 18 on the surface 12, such as at any of crosspoints 50.

Connecting the tip 14 of the probe with a suitable potential indicating device 52 is a flexible insulated conductor 53. For reasons that will appear more clearly in describing the manner of establishing a suitable electric field, the indicating device 52 is preferably a high impedance instrument such as a vacuum tube voltmeter or recording potentiometer.

Considering now the manner of establishing an electric field on the surface 12 to represent the prescribed function by a variation in potential, it will be evident that the surface 12 is the exposed face of a plate or sheet 55 of conductive material. Where the coordinate grid 18 consists of an orthogonal set of parallel lines 20, 21, plate 55 conveniently is of rectangular outline as shown in FIG. 1. Its composition may be of any relatively high resistivity substance, such as conductive carbon, a conductive plastic or conductive rubber. To render the resistance characteristics of the plate uniform in each direction, the plate has substantially a uniform isotropic resistivity and is of uniform thickness having a planar top and bottom face. Thus, the plate 55 is susceptible to the establishment of a varying potential field across the surface 12 which is effectively independent of the resistance characteristics and geometry of the plate.

Figure 2:
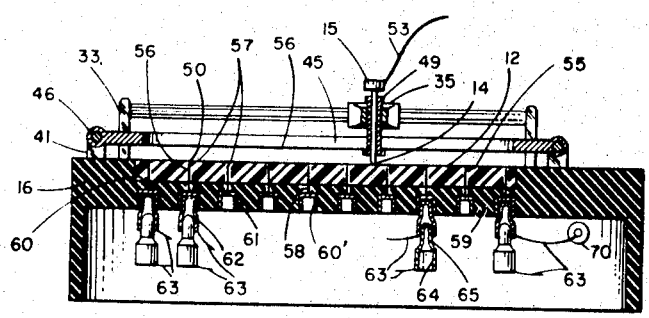
FIG. 2 is a section taken along the line 2—2 of FIG. 1.

Since the probe 15 is positioned with reference to the coordinate grid 18 in accordance with the input signals $x$ and $y$, the potentials in the electric field on the surface 12 representing the dependent variable $z$ must be related in value to the coordinate grid. Thus, the potentials at each of the crosspoints 50 for the coordinate lines 20, 21 must represent the $z$ values corresponding to those $x$ and $y$ values which would cause positioning of the probe 15 at such points. Rather than attempting to establish a predetermined potential at each and every point on the surface 12, the potentials only at the crosspoints 50 are fixed in accordance with this invention, relying upon the uniform resistance characteristics of the plate 55 to effect an interpolation between these points for representation of the function at every point within a prescribed degree of accuracy. To this end, there is imbedded in the plate 20 at each of the crosspoints 50 of the grid a conductive tap wire 56 (FIG. 2). Each tap wire 56 extends from beneath the plate 55 perpendicularly toward the surface 12 to a tap point 57 immediately beneath a crosspoint 50 on the surface. Thus, the wearing properties of the surface 12 and its smooth continuity are preserved. Segments 58 of the tap wires 56 which extend beneath the plate 55 are imbedded in a portion 59 of the base 16. This base portion 59 then underlies a recess 60 in which the plate 55 is received.

Figure 3:
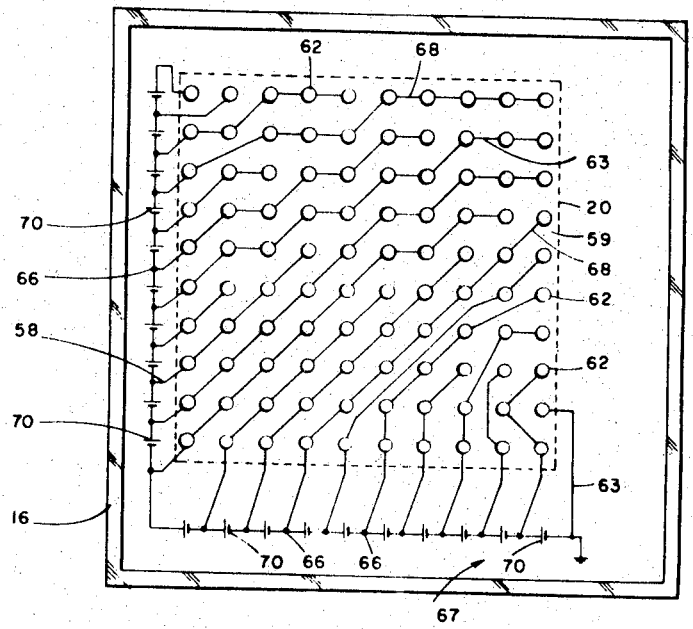
FIG. 3 is a bottom view of the apparatus of FIG. 1, showing the power supply in schematic form.

In blind wells 60' formed in the underface of the base portion 59 are received socket connectors 61, each connecting with a corresponding tap wire 56. These sockets 61 are arranged for free reception and disconnection of plug connectors 62 connected with plug wires 63 so as to form effectively a plugboard on the underside of the base 16. The plug connectors 62 are each provided with a socket portion 64 opening at the end opposite from a plug portion 65 which is receivable in the sockets 61. By reason of this construction, the plug wires 63 and connectors 62 not only afford selective connection between terminals 66 of a power supply 67 to the sockets 61 but also, as seen in FIG. 3, allow jumpering between these sockets as at 68. The power supply 67 is designed to supply discrete potentials increasing in successive increments and, therefore, conveniently has the form of batteries 70 series connected at the terminals or junctions 66. In accordance with the pattern of jumpered connections, a representative one being shown in FIG. 3, the tap points 57 will be connected to the junctions 66 to assume the discrete potentials established by the batteries 70. To isolate the tap wires 56 from one another, as well as to isolate the sockets 61 at least the portion 59 of the base underlying the plate 55 is composed of an insulating material such as a suitable plastic substance. To complete a circuit for the indicating device 52, one of its terminals is grounded as is one of the terminals of the power supply 67, namely the negative terminal.

In the operation of this function generator, signals representing the independent input variables $x$ and $y$ are applied respectively to the terminals 25 and 26. Such signals may, for example, be continuously varying D.-C. potentials. The $x$ input signal is transmitted from the terminals 25 to the positional servomotor 23 causing the servomotor to rotate the screwshaft 29 until the probe 15 is guided by the bridge 35 to a point representing the input $x$ value relative to the coordinate grid lines 20. Simultaneously, the signal applied at terminals 26 representing the input variable $y$ energizes the servomotor 24 to position the bridge 45 so that the probe 15 contacts a point on the surface 12 representing the instantaneous value of the variable $y$ with respect to the grid lines 21. In this manner probe 15 is moved in continuous contact with the conductive surface to a point which, relative to the grid lines 20, 21, represents the instantaneous values of the input variables $x$ and $y$.

An electric field is established on the surface 12 by the selective application to the tap wires 56 of discrete regulated potentials in a pattern of amplitudes conforming to a prescribed function. Such conformance is obtained by the selective plug connection of the sockets 61 with the correct terminals 66 of the power supply. Since the tap points 57 with which the tap wires 56 connect closely underlie the surface 12 of the conductor plate 44, the potential of the surface opposite the tap points will be substantially the same as that of the associated tap wires.

The uniform resistivity characteristics of the plate 55 result in a smooth variation in potential between the various tap points constituting an interpolation not only between the potentials of the nearest tap points but also to a lesser degree between potentials of more remote tap points. The interpolation provided is thus of a higher order than linear. For a reasonably well behaved function, the consequence of this higher order interpolation is that potentials may be applied at a relatively few tap points to establish a potential variation over the entire surface of the plate 20 corresponding to a prescribed function with a satisfactory degree of accuracy. Because whatever current is drawn by the probe 15 is supplied in parallel from the adjacent tap points, the loading effect and consequent depression of measured potential is slight. For any single valued function which is thus represented by the electric field, the potential detected by the probe 15 will have an accurate functional correspondence.

For some functions, a coordinate grid different from the illustrated rectangular coordinate grid 18 might be desired. For example, some functions are most readily expressed in terms of polar coordinates. Thus, the principles of this invention may be adapted to any orthogonal or other set of coordinate lines forming a grid with respect to which the input variables may be measured. Advantageously, both the pattern of the tap points 57 and the movement of the probe 15 would conform with whatever coordinate grid is employed. However, an effective coordinate transformation may be obtained with function generation, if desired, by patterning the tap points in terms of one type of coordinate grid, while employing another coordinate grid to relate the movements of the probe in terms of the $x$ and $y$ input variables. Where the function generator is utilized infrequently or only for a limited amount of input data, manual drive means might readily be employed to position the probe.

The materials and configuration for the base 16 and the plate 55 supported thereby are, of course, subject to wide variations. Thus, while a flat or planar conductive surface 12 ordinarily will offer the greatest advantages from the standpoint of ready production and accurate positioning of the probe, a cylindrical or other configuration could be adopted, as where space considerations are of concern. An economy might be secured by replacing the series-connected batteries 70 with a voltage dividing network. If desired, the voltage steps provided by such a network could be made adjustable, as by the use of variable resistors or rheostats.

It will be evident that the numbers of tap points and discrete voltages may be increased to obtain a more accurate representation of a function. For a specific function having high gradients in a localized region of the $x$-$y$ plane, additional tap points might be added to this region to improve the conformance of the potential gradients to function gradients.

The invention is not to be limited to the specific apparatus disclosed herein but is defined in the appended claims.

I claim:

1. An electrical function-generating device comprising, in combination: a member having upper and lower opposed faces, said member being fabricated from a material having uniform resistive characteristics; a plurality of field-establishing means spaced from each other and in contact with the lower of said opposed faces, the spacing and arrangement of said field-establishing means being in accordance with a predetermined plan for establishing a desired electric field pattern along the surface of the upper of said opposed faces, said resistive member acting as a smoothing means for reducing the abruptness of the variations in potential between said field-establishing means so that the field appearing on said upper face varies in a smoother manner than the field appearing on said lower face; potential-deriving means in contact with the surface of said upper face, said potential-deriving means being movable along a predetermined path whereby a specific function of electric potential may be derived; and means for moving said potential-deriving means along said predetermined path.

2. An electrical function-generating device comprising, in combination: a plate having opposed upper and lower faces, said plate being fabricated from material having uniform electrical resistivity per unit volume; a plurality of electrodes spaced from each other and in contact with the lower of said opposed faces, the spacing and arrangement of said electrodes being in accordance with a predetermined plan for establishing a desired electric field pattern along the surface of the upper of said opposed faces, said resistive member acting as a smoothing means for reducing the abruptness of the variations in potential between said electrodes so that the field appearing on said upper face varies in a smoother manner than the field appearing on said lower face; a contact element in contact with the surface of said upper face, said contact element being movable along a predetermined path whereby a specific function of electric potential may be derived; and means to move said contact element along said predetermined path.

3. In apparatus for generating a function of two variables, a base composed of insulating material, a plate composed of uniformly conductive material supported thereby with a smooth planar surface exposed, tap wires imbedded in said plate arranged in rows and columns conforming to a two-coordinate grid, said tap wires terminating in points spaced immediately beneath said surface, socket connectors disposed in said base in an array similar to said tap wires and connected with corresponding tap wires, plug connectors receivable in said sockets for selectively applying discrete potentials to said tap wires in a pattern represenative of said function, a probe for making continuous point contact with said surface for detecting the potential thereat, means including a servomechanism responsive to signals representing each of said variables for positioning said probe in relation to said coordinate grid, and a high impedance indicating device connected with said probe for indicating the potential detected thereby.

4. In apparatus for generating a non-linear function of two variables, a plate having a uniformly conductive surface, a plurality of tap wires extending into said plate beneath and in a direction normal to said surface and terminating immediately beneath said surface in electrical contact therewith, said tap wires being located throughout the area underlying the conductive surface to define intersections of a system of imaginary two co-ordinate grid lines, means including a probe in continuous movable electric contact with said surface to detect the potential at a point thereon, means responsive to a pair of signals representing said two variables for positioning said probe at a point representing said two variables in terms of the respective coordinates, and means for applying a plurality of discrete potentials to said tap wires to establish a potential variation across said surface representing said non-linear function in terms of said coordinates.

References Cited
UNITED STATES PATENTS

| | | |
|---|---|---|
| 2,452,664 | 11/1948 | Koenig. |
| 2,541,277 | 2/1951 | Omberg et al. |
| 2,542,478 | 2/1951 | Clark. |
| 2,617,587 | 11/1952 | Carpenter. |
| 2,656,618 | 10/1953 | Pescatori _____ 35—9 |
| 2,704,305 | 3/1955 | McLaughlin et al. |
| 2,734,137 | 2/1956 | Patterson. |

RICHARD M. WOOD, *Primary Examiner.*

L. M. ANDRUS, L. SMILOW, M. A. LYONS, N. MARMELSTEIN, W. H. KING, *Examiners.*

R. A. JOHNSON, H. T. POWELL, W. D. BROOKS,
*Assistant Examiners.*